(12) United States Patent
Zhong et al.

(10) Patent No.: US 7,499,652 B2
(45) Date of Patent: Mar. 3, 2009

(54) MODULAR ADD/DROP MULTIPLEXER INCLUDING A WAVELENGTH SELECTIVE SWITCH

(75) Inventors: Shan Zhong, Ellicott City, MD (US); Charles Haggans, Boulder, CO (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 11/855,427

(22) Filed: Sep. 14, 2007

(65) Prior Publication Data

US 2008/0002974 A1 Jan. 3, 2008

Related U.S. Application Data

(62) Division of application No. 10/768,057, filed on Feb. 2, 2004, now Pat. No. 7,308,197.

(60) Provisional application No. 60/444,284, filed on Jan. 31, 2003, provisional application No. 60/443,898, filed on Jan. 31, 2003.

(51) Int. Cl.
*H04J 14/02* (2006.01)

(52) U.S. Cl. ............................. 398/83; 398/48
(58) Field of Classification Search ............. 398/48–51, 398/83–87
See application file for complete search history.

(56) References Cited

U.S. PATENT DOCUMENTS

| | | | | |
|---|---|---|---|---|
| 6,122,096 A | * | 9/2000 | Fatehi | 359/337.21 |
| 6,348,984 B1 | * | 2/2002 | Mizrahi | 398/79 |
| 2002/0186432 A1 | * | 12/2002 | Roorda et al. | 359/128 |

* cited by examiner

*Primary Examiner*—Leslie Pascal
(74) *Attorney, Agent, or Firm*—Clements Bernard Miller; Christopher L. Bernard; Tyler S. Brown

(57) ABSTRACT

Consistent with the present invention, tunable demultiplexers are provided in WSS-based add/drop multiplexer. The tunable demultiplexers are modular and thus allow the add/drop multiplexer to be readily expandable, and facilitate flexible add/drop capabilities whereby a channel present on any input line to the WSS can be dropped and supplied to one or more desired outputs of the tunable demultiplexer. Similar flexibility can be achieved on the add-side of the WSS. Moreover, the demultiplexers and the WSS are remotely configurable, thus obviating the need to manually disconnect and connect demultiplexers to a router. In a particular embodiment, multicast switches are provided that permit the same channel, for example, to be provided to one or more outputs of the add/drop multiplexer, such that copy of the channel can carry working traffic while the other copy carries protection traffic. As a result, 1+1 and 1:N optical layer protection can be achieved.

7 Claims, 6 Drawing Sheets

MODULAR ADD/DROP MULTIPLEXER INCLUDING A WAVELENGTH SELECTIVE SWITCH

CROSS-REFERENCE TO RELATED APPLICATION(S)

The present non-provisional patent application is a divisional of U.S. patent application Ser. No. 10/768,057, filed Feb. 2, 2004, now U.S. Pat. No. 7,308,197 and entitled "MODULAR ADD/DROP MULTIPLEXER INCLUDING A WAVELENGTH SELECTIVE SWITCH," which claims the benefit of priority of U.S. Provisional Patent Application Nos. 60/444,284 and 60/443,898, both filed Jan. 31, 2003, all of which are incorporated in full by reference herein.

FIELD OF THE INVENTION

The present invention generally relates to optical communication systems. More specifically, the invention is directed toward optical multiplexer/demultiplexer structures and related methods.

BACKGROUND OF THE INVENTION

In optical communication systems, optical signal are transmitted along an optical communication path, such as an optical fiber. Early systems deployed a single transmitter at a nominal wavelength at one end of an optical fiber link and receiver at the other end to detect incoming signals. More recently wavelength division multiplexed (WDM) system have been developed in which multiple colors or wavelengths of light are combined onto a single fiber in order to increase bandwidth of information carrying capacity of an optical communication network.

In a WDM system, a plurality of optical transmitters feed corresponding signals to an optical multiplexer is often provided at one end of an optical fiber link and an optical demultiplexer is provided at the other end to separate the WDM signal into individual optical signals at corresponding wavelengths. Often, however, network configurations may require that certain wavelengths be "dropped" or selected from the WDM signal prior to reaching the demultiplexer at the termination point of the fiber link. In addition, optical signals at the drop wavelength or other wavelengths may be required to be added prior to the termination point. Accordingly, so-called add-drop multiplexer have been developed to add/drop optical signals at certain wavelengths, while permitting optical signals at other wavelengths to pass to the termination point.

A conventional add/drop multiplexer is described, for example, in U.S. Pat. No. 6,459,516, incorporated by reference herein. This add/drop multiplexer can flexibly accommodate a relatively large number of added and dropped optical signal or channels. The channels that are added and dropped are fixed, however, and the add/drop multiplexer is not remotely reconfigurable.

An alternative add/drop multiplexer is the Select Optical Add/Drop Multiplexer ("S-OADM") commercially available from CIENA Corporation of Linthicum, Md. As shown in FIG. 1, the S-OADM receives incoming optical signals through an optical amplifier 110. The optical signals are next passed to a power splitter or coupler 120, which supplies a first portion of each incoming optical signal to a reconfigurable blocking filter (RBF) 130 and a second portion of each signal to a pre-booster amplifier 160 and to router 180. Router 180 separates the WDM signal into separate channel groups, one of which is passed through a segment of dispersion compensating fiber (DCF) 121, and then to optical amplifier USA 197. The channel group is next fed to a channel group demultiplexer including 1×8 splitter 119, which supplies the channel group on each of eight outputs. Splitter 119 is a conventional power splitter so that the signal strength of each output is attenuated is about ⅛ the power of the incoming signal. Channel filters (not shown) are coupled to each output of splitter 119 to select individual channels from each splitter output and supply the demultiplexed channels to corresponding receivers (not shown).

Added channels are supplied from transmitters (not shown) to an 8×1 combiner 117 through amplifier 115 and to router 195. At the output of router 195, the added channel group is passed through an optional segment of dispersion compensating fiber 190, and amplified by amplifier 170. The channel group is next combined with channels output from RBF 130 by coupler 140, and the resulting WDM signal is output through amplifier 150.

In operation, the RBF is configured to block the channel group selected by port 161 of router 180, while remaining channel groups pass through. Although non-selected wavelengths are also supplied to router 180, no demultiplexing elements or receivers are provided to sense the non-selected wavelengths. The added channels are typically at the same wavelength as the blocked channels to prevent interference between those signals passed through RBF 130 and those, which are added. Alternatively, the added channels may be different from any of the pass through channels.

Moreover, RBF 130 can be reconfigured so that a different channel group is blocked. In which case, demultiplexers must be added to a different port or slot of router 180, for example. Since add/drop multiplexers are often deployed in remote locations, service personnel must travel to the add/drop multiplexer site and physically attach the channel group demultiplexer to a new output port of router 180.

Alternatively, RBF 130 can be replaced with a so-called wavelength selective switch or WSS 210, as shown in FIG. 2. Wavelength selective switches are known components that coupled to multiple input and output lines, and can selectively block optical signals on a per wavelength basis. In this instance, WSS 210 is coupled to input lines 209, 213 and 215, and output lines 222, 225 and 226. The operation of routers and group demultiplexers is similar as that discussed above in regard to FIG. 1. However, as further shown in FIG. 2, additional routers can be provided, each one coupled to a corresponding one of the input or output lines. However, the WSS-based add/drop multiplexer shown in FIG. 2 suffers from similar disadvantages discussed above with respect to FIG. 1. Namely, any reconfiguration of WSS 210 resulting in a change in the wavelengths to be added and dropped requires physically coupling channel group demultiplexers to a different router output port.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF INVENTION

Consistent with the present invention, tunable demultiplexers are provided in WSS-based add/drop multiplexer. The tunable demultiplexers are modular and thus allow the add/drop multiplexer to be readily expandable, and facilitate flexible add/drop capabilities whereby a channel present on any input line to the WSS can be dropped and supplied to one or more desired outputs of the tunable demultiplexer. Similar flexibility can be achieved on the add-side of the WSS. Moreover, the demultiplexers and the WSS are remotely configurable, thus obviating the need to manually disconnect and connect demultiplexers to a router. In a particular embodiment, multicast switches are provided that permit the same channel, for example, to be provided to one or more outputs of the add/drop multiplexer, such that copy of the channel can carry working traffic while the other copy carries protection traffic. As a result, 1+1 and 1:N optical layer protection can be achieved.

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Figure 1:
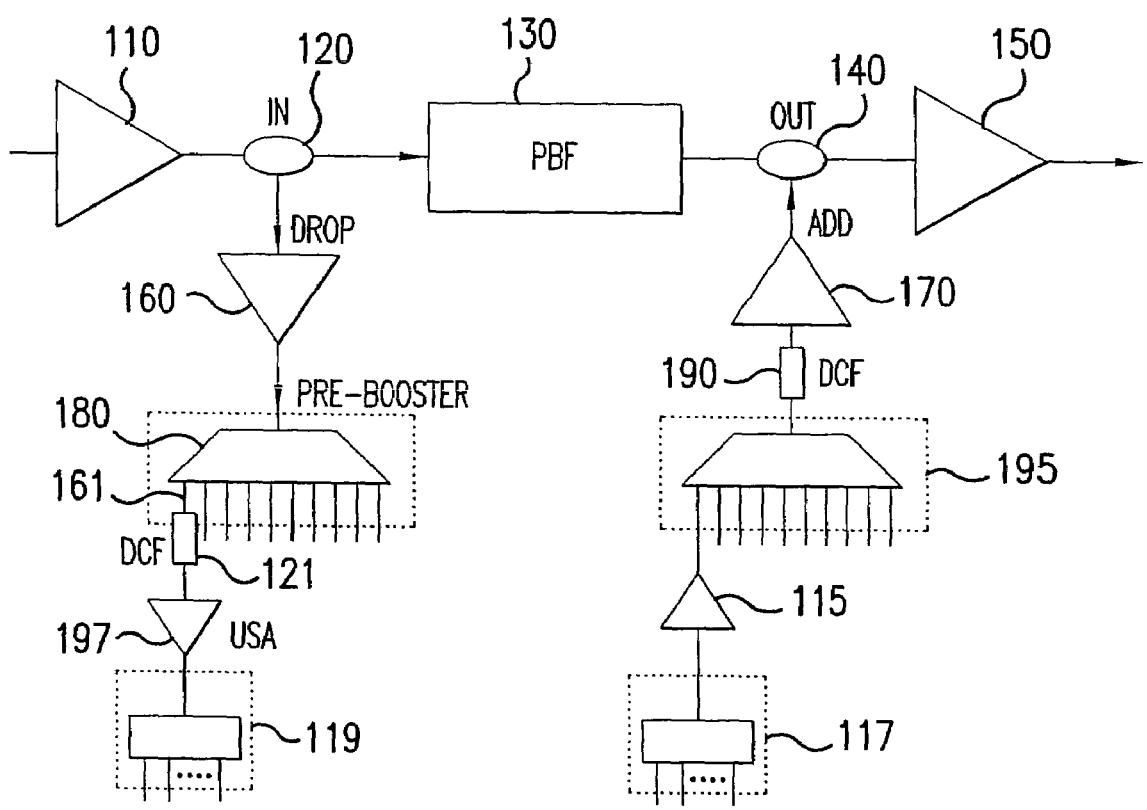
FIG. 1 illustrates a block diagram of a conventional add/drop multiplexer incorporating a reconfigurable blocking filter.
Figure 2:
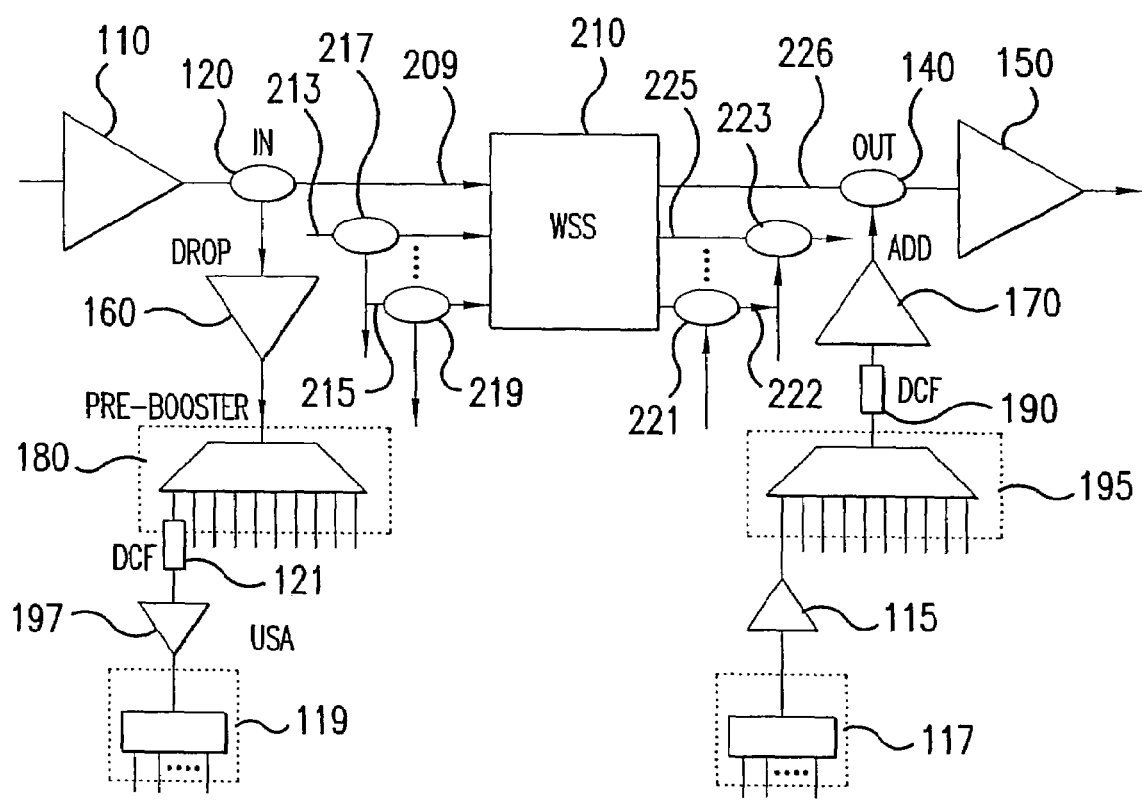
FIG. 2 illustrates a block diagram of a conventional add/drop multiplexer incorporating a wavelength selective switch.
Figure 3:
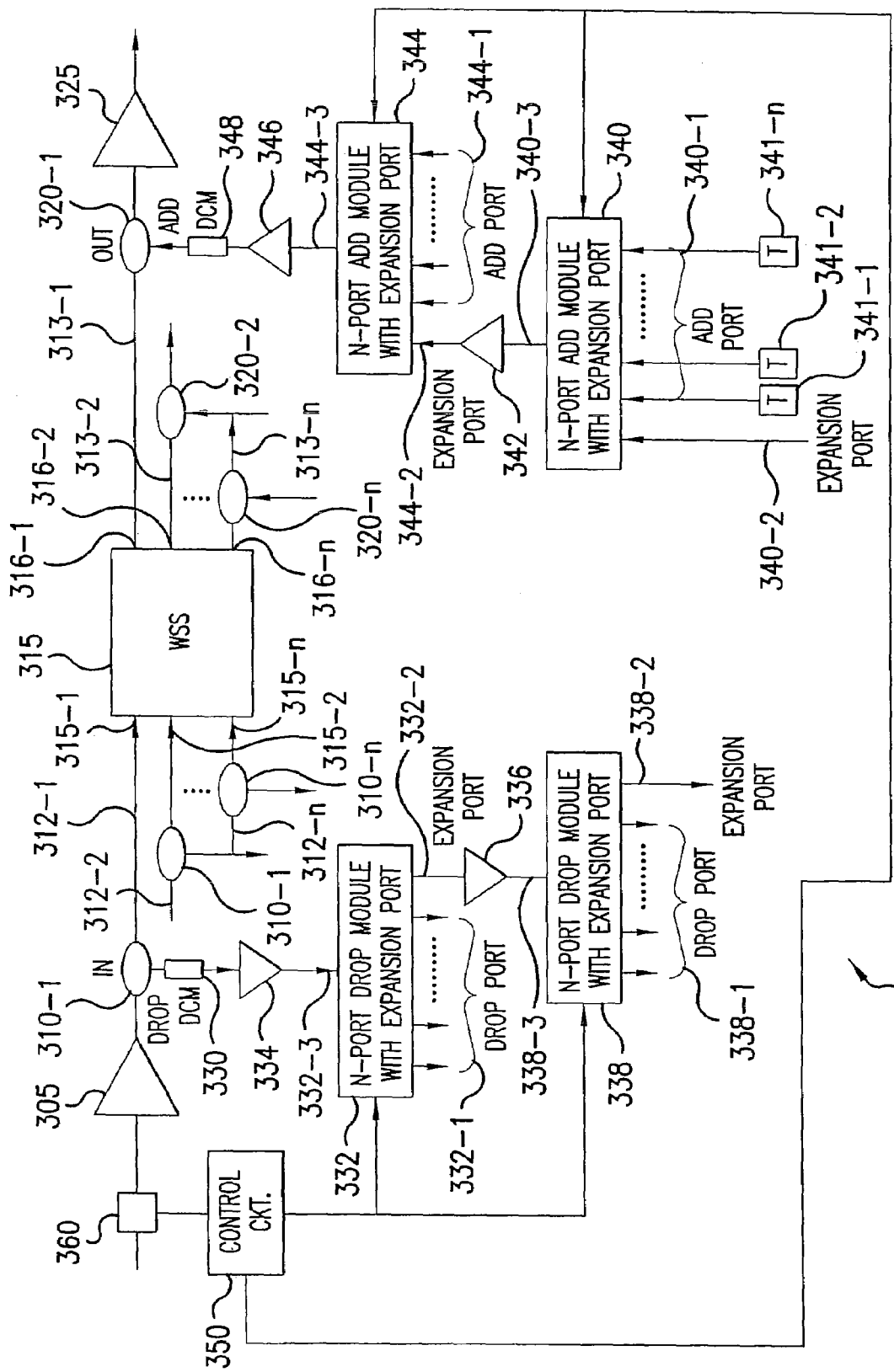
FIG. 3 illustrates a block diagram of a WSS-based optical add/drop multiplexer consistent with an aspect of the present invention.

FIG. 3 illustrates a WSS-based add/drop multiplexer 302 consistent with a first embodiment of the present invention. Add/drop multiplexer 302 includes a WSS 315 having a plurality of input ports 315-1 to 315-n coupled to a respective one of a plurality of input optical communication paths 312-1 to 312-n. Each optical communication path 312-1 to 312-n may optionally be coupled to an optical amplifier, such as optical amplifier 305 coupled to optical communication path 312-1. Optical communication paths 312-1 to 312-n each typically include commercially available optical fiber, and optical amplifier 305 is typically a conventional erbium doped fiber amplifier. Optical signals, each typically at a particular wavelength and collectively constituting a WDM signal propagate along optical communication path 312-1. Other WDM signals likewise travel along optical communication paths 312-2 to 312-n in a similar fashion.

As further shown in FIG. 3, power splitter 310-1, including for example, a fiber optic coupler, tap, or other suitable optical component is coupled to input optical communication path 312-1. Likewise, power splitters 310-2 to 310-n are coupled to respective input optical communication paths 312-2 to 312-n. A first portion of the WDM signal propagating on input optical communication path 312-1 is output from splitter 310-1, through optional dispersion compensating module 330 and optional optical amplifier 334 to input port 332-3 of tunable optical demultiplexer 332. Selected channels, i.e., optical signals at specific wavelengths, are respectively output from corresponding ones of outputs 332-1. Other channels, however, are output through expansion port 332-2, and fed through optional optical amplifier 336 to input port 338-3 of tunable demultiplexer 338. These other channels are then separated and supplied to corresponding ones of first outputs 338-1 and to receivers discussed in greater detail below, but a second output, 338-2, is a supplemental port not connected to any receivers.

Initially deployed WDM systems are not fully populated with a maximum number of channels, as capacity requirements are typically lower at first but increase over time. Thus, a full complement of demultiplexers may not be required at first, but rather a smaller number is sufficient to drop the relatively low numbers of channels typically present when a system is first deployed. Accordingly, a limited number of tunable demultiplexers are often provided at system turn-up, but each has a supplemental port, not connected to receiver circuits, so that additional tunable demultiplexers may be attached later on as capacity requirements grow. Large demultiplexer optical circuits need not be installed early in a product life cycle. Instead, modular tunable demultiplexers are added incrementally on an as-needed basis, resulting in substantial cost savings.

Returning to FIG. 3, demultiplexer 332 is tunable because the wavelengths selected for output at each port can be tuned or adjusted in response to a control signal. For example, an optical signal having wavelength $\lambda_1$ may be initially output from one of drop ports 332-1 of flexible demultiplexer 332 (N-port drop module). In response to a control signal, however, a different optical signal having wavelength $\lambda_9$ may be output.

Control information can be carried by an optical service channel present on one of input optical communication paths 312-1, for example. An additional optical demultiplexer 360, such as an optical filter, selects the optical service channel, which is typically at a wavelength different than other information carrying wavelengths of the WDM signal. As generally understood, the service channel often carries optical system or network related information, such as diagnostic, monitoring, as well as control information. The service channel is output from demultiplexer 360 and supplied to a control circuit 350, which converts the service channel into corresponding electrical signals in a known manner, and generates appropriate control signals in response to the received service channel. The control signals may be supplied to each of tunable demultiplexers 332 and 338, for example.

Adding channels is similar to dropping them, but in reverse. A plurality of conventional tunable optical transmitters 341-1 to 341-N are coupled to respective ones of inputs or add ports 340-1 of combiner or tunable multiplexer 340. Multiplexer 340 also has a supplemental input or expansion port not coupled to an optical transmitter to accommodate further combiners as system capacity requirements increase. Optical signals generated by transmitters 341-1 to 341-N are typically each at a different wavelength and are supplied to output 340-3, through optional optical amplifier 342, and to input or expansion port 344-2 of combiner 344. Combiner 344 also receives additional optical signals, each at a respective wavelength, on respective ones of add ports or inputs 344-1 from transmitters (not shown) similar to transmitters 341-1 to 341-N. The optical signals supplied through expansion port 344-2 and add ports 344-1 are combined onto output 344-3 and fed to optical combiner 320-1 through optional optical amplifier 346 and optional dispersion compensating element 348. Optical combiner 320-1 combines these optical signals with signals output from WSS 315 through port 316-1 onto output communication path 313-1 through optional optical amplifier 325. Optical amplifier 325, as well as other optical amplifiers described herein, are provided to offset any attenuation of optical signals passing through WSS 315, as well as those added and dropped by add/drop multiplexer 302.

Moreover, additional combiners, similar to 340 and 344 can be coupled in a similar manner to combiners 320-2 to 320-n to facilitate coupling or combining of optical signals output from WSS output ports 316-2 to 316-n onto further output optical communication paths 313-2 to 313-n. Tunable multiplexers or combiners 340 and 344 can have a similar structure as tunable demultiplexers 332 and 338, but connected in reverse so that add ports input signals instead of outputting them, and the outputs of combiners 340 and 344 supply signals instead of receiving them.

Although tunable demultiplexers are shown for combining optical signals in the embodiments disclosed herein, other combiners can also be used. For example, conventional passive combiners, or other suitable optical components that combine optical signals can be used in conjunction with the present invention. It is noted that passive optical combiners typically cost less than tunable demultiplexers.

Figure 4C:
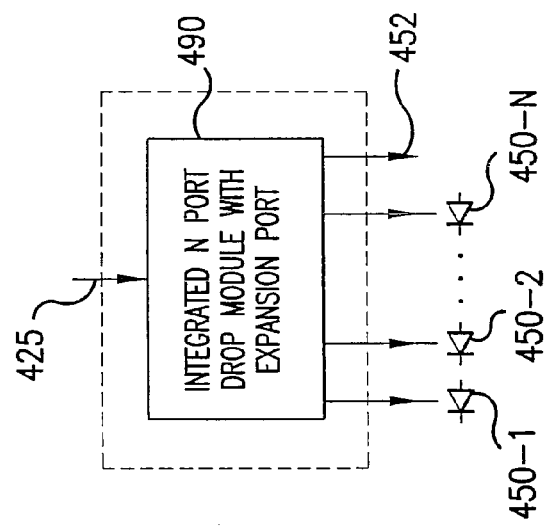
FIGS. 4(a)-4(c) illustrates block diagrams of examples of tunable demultiplexers.
Figure 4B:
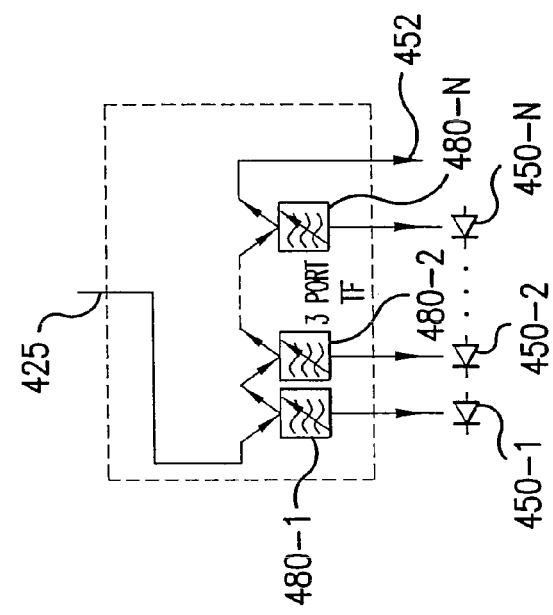
Figure 4A:
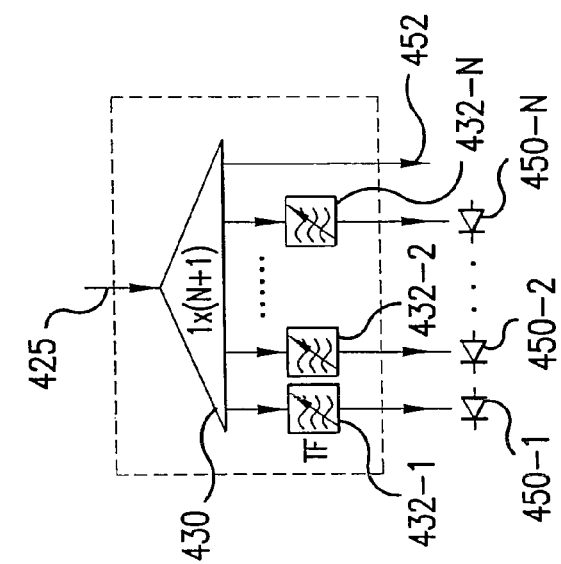

FIGS. 4(a)-4(c) illustrate different examples of tunable demultiplexers consistent with the present invention. It is understood that any of the demultiplexers may have a construction, as shown in one or more of FIGS. 4(a)-4(c). In the example shown in FIG. 4(a), the tunable demultiplexer includes a 1×N+1 splitter 430 having an input 425 (corresponding e.g., to input 332-1) that receives signals supplied from splitter 310-1 in FIG. 3, for example. Splitter 430 has N+1 outputs, N of which supply attenuated portions of the input signal to corresponding tunable filters 432-1 to 432-N, each of which is controlled in accordance with information contained in or in response to a service channel (see above discussion) to select an optical signal at a desired wavelength. The filtered optical signals are then supplied to corresponding receivers 450-1 to 450-N. The N+1th output, however, corresponds to the supplemental or expansion output to facilitate modular expansion of the demultiplexing capabilities of the add/drop multiplexer in an inexpensive manner, as further discussed above.

In FIG. 4(b), tunable filters 480-1 to 480-N are cascaded whereby optical signals fed through input 425 are first supplied to tunable filter 480-1, which reflects, for example, one of the input signals, but passes the remaining signals. The remaining signals are then input to tunable filter 480-2, which selects another signal in a similar fashion as tunable filter 480-1. The remaining signals are passed from one tunable filter to the next, and at each filter, a different channel is selected. The selected channels are, in turn, fed to corresponding receivers 450-1 to 450-N. If any channels are not selected by tunable filters 480-1 to 480-N are fed to supplemental output 452, for propagation to another tunable demultiplexer, as noted above. Tunable filters 480-1 to 480-N are controlled in response to the service channel.

As shown in FIG. 4, an integrated N port drop module including tunable filters configured as shown in either FIG. 4(a) or FIG. 4(b) may also be provided. In which cases the tunable filters and other necessary components are integrated into a single component housing 490. As in other examples, a supplemental port 452 is also included.

Tunable filters shown above are commercially available from JDS Uniphase, Ilon and Little Optics. The integrated N port drop module shown in FIG. 4(c) is also commercially available from JDS Uniphase.

As noted previously, the embodiment shown in FIG. 3 provides a cost effective, yet flexible approach to expanding a WSS-based optical add/drop multiplexer. An alternative embodiment will next be described with reference to FIG. 5 illustrating add/drop multiplexer 510 consistent with a further aspect of the present invention.

Figure 5:
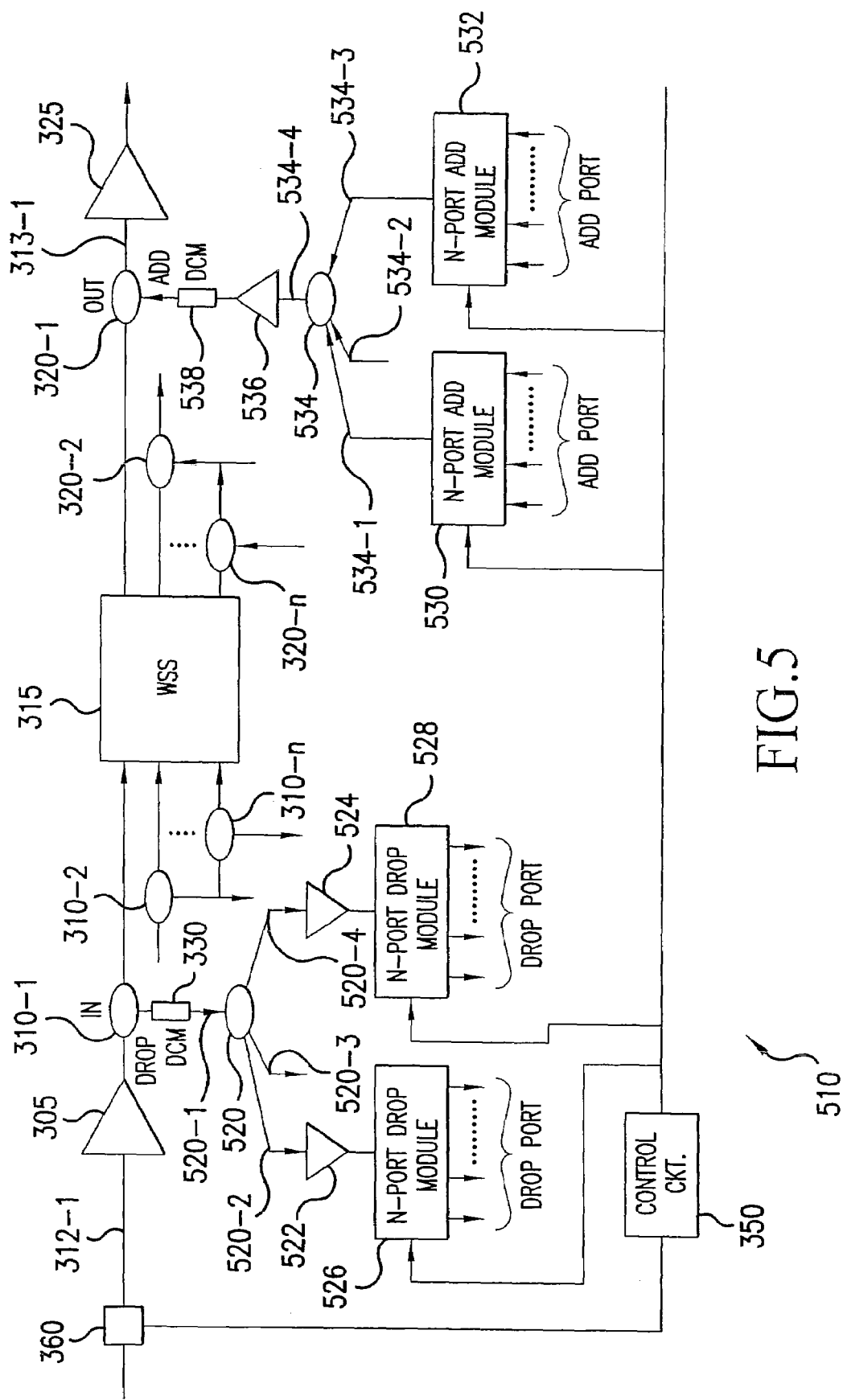
FIG. 5 is a block diagram of a further embodiment of the present invention.

As with add/drop multiplexer 302 shown in FIG. 3, the embodiment shown in FIG. 5 also includes WSS 315, as well as a plurality of input and output optical communication paths, and splitters 310-1 to 310-n. In addition, add/drop multiplexer 510 shown in FIG. 5 similarly includes combiners 320-1 to 320-n and output optical communication paths, as discussed above in regard to FIG. 3. The operation of these elements has been described above with respect to FIG. 3.

Add/drop multiplexer 510, however, differs from add/drop multiplexer 302 in that tunable demultiplexers and multiplexers with supplemental or expansion ports are replaced with additional splitter 520 and combiner 534, for example. Tunable demultiplexers 526 and 528 are also typically included. Although each of tunable elements 526, 528, 530 and 532 are shown without supplemental ports, such supplemental ports can be provided, if necessary, and further tunable multiplexers and demultiplexers attached in a manner similar to that described above in regard to FIG. 3.

The operation of add/drop multiplexer 510 will next be described. Optical signals input from splitter 310-1 and dispersion compensation element 330, for example, are supplied to optical splitter 520, typically a power splitter, through input 520-1 which, in turn, supplies portions of the received optical signals to each of outputs 520-2 to 520-4. Outputs 520-2 and 520-4 are respectively coupled, through optical amplifiers 522 and 524, respectively, to tunable demultiplexers 526 and 528, which separate the optical signals input thereto in response to a service channel carried on input optical communication path, for example, in a manner similar to that described above with respect to FIGS. 3 and 4(a)-4(c). As a result, desired dropped channels are output from the drop ports shown in FIG. 5. It is understood, that additional splitters are coupled to splitters 310-2 to 310-n, and additional tunable demultiplexers are coupled to these additional splitters in a manner similar to that discussed above in regard to splitter 520, and tunable demultiplexers 526 and 528.

Optical splitter 520 also has a supplemental port or output 520-3 not coupled to a tunable demultiplexer. Supplemental output 520-3 can accommodate an additional tunable demultiplexer, should one be needed in light of increased capacity needs requiring that additional channels be dropped. Upon initial deployment, however, when a communication system is not fully populated with WDM signals, as noted above, the supplemental output of splitter 520, for example, allows for modular expansion and a cost-effective upgrade path.

As further shown in FIG. 5, added channels supplied to tunable multiplexers or combiners 530 and 532 in a manner similar to that described above with respect to tunable multiplexers 340 and 344. In response to the service channel, tunable multiplexers 530 and 532 combine signals supplied thereto typically onto a single output, which is coupled to corresponding inputs 534-1 and 534-3 or combiner 534. The signals output form tunable multiplexers 530 and 532 are then further combined onto output 534-4 of combiner 534. These signals are then optionally amplified by amplifier 536, passed though optional dispersion compensating element 538, and fed to output optical communication path by combiner 320-1.

Combiner 534 has a supplemental input not coupled to a tunable multiplexer, for expansion purposes and accommodating modular growth.

Further combiners similar to combiner 534 are also coupled to corresponding ones of combiners 320-2 to 320-n. Also additional tunable multiplexer can be coupled to such further combiners in a similar fashion as that described above in regard to tunable multiplexers 530 and 532.

The add/drop multiplexers discussed above are advantageous in that each can provide a cost-effective growth path for system operators and users. Moreover, these add/drop multiplexers provide substantial flexibility by permitting dropping of any channel present on a particular input optical communication path. Further, any channel can be added to a particular output optical communication path. Nevertheless, the above-described embodiments are limited in that each tunable demultiplexer and multiplexer is dedicated either to a particular input or output optical communication path. Greater system flexibility can be achieved when the tunable multiplexers and demultiplexers can be coupled to any input or output optical communication path of the WSS, as discussed in greater detail below with respect to FIGS. 6.

Figure 6:
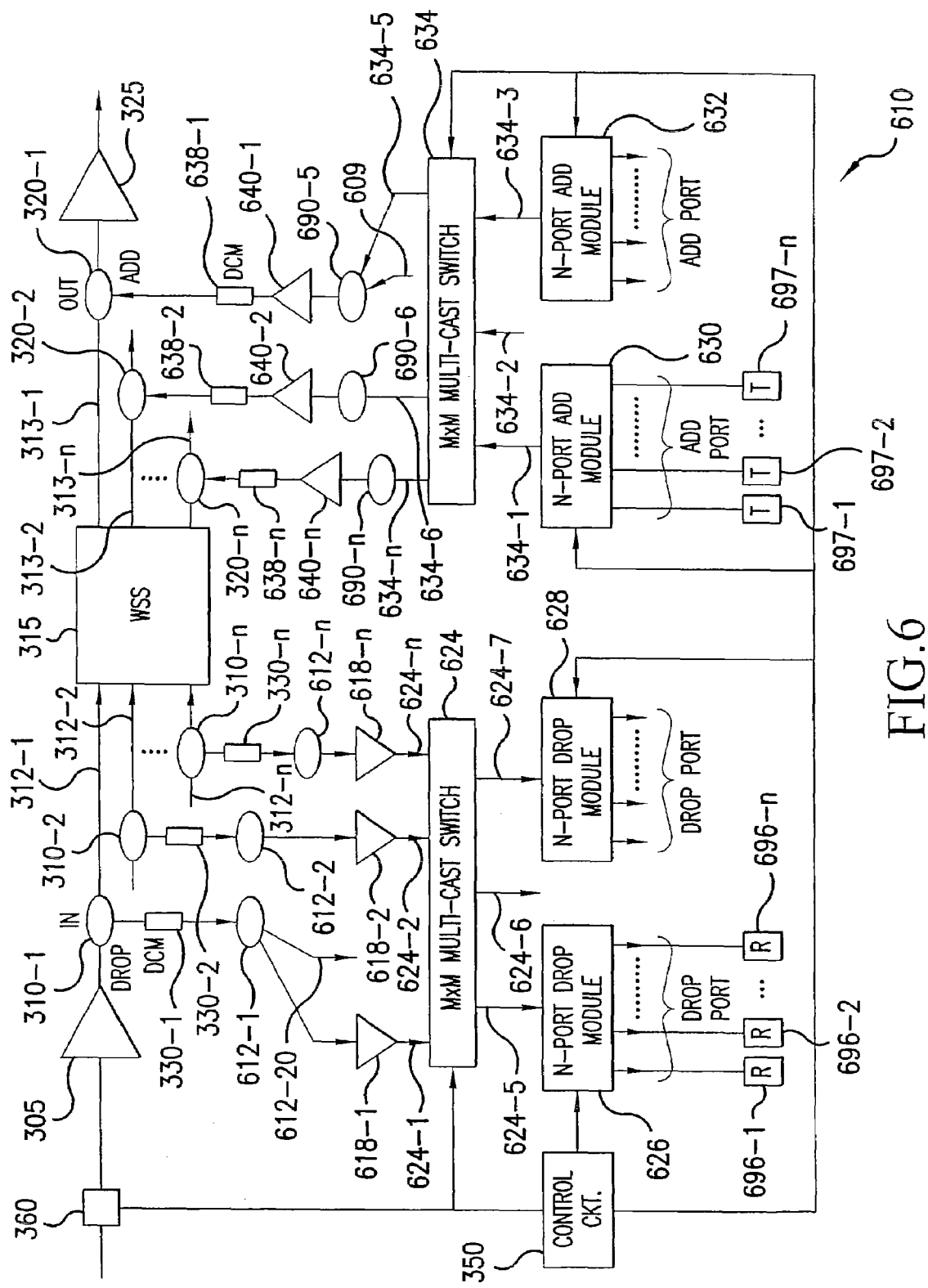
FIG. 6 illustrates a block diagram of an additional embodiment of the present invention including a multi-cast switch.

Add/drop multiplexer 610 shown in FIG. 6 is similar to add/drop multiplexer 510 shown in FIG. 5. Instead of providing splitters, such as splitter 520, however, being coupled to a bank of amplifiers and tunable demultiplexers, however, a plurality of splitters 612-1 to 612-n are provided each of which is coupled to a corresponding one of splitters 310-1 to 310-n. Each of splitters 612-1 to 612-n typically has an output coupled, through a respective one of amplifiers 618-1 to 618-n to a multi-cast optical switch (such as an 8×8 multi-cast switch commercially available from Lynx Photonics). On the add side, a multi-cast optical switch is provided for coupling tunable multiplexers to desired output optical communication path.

In operation, a portion of WDM signal present on input optical communication path 312 is passed through optional dispersion compensating element 330-1 and supplied to splitter 612-1. Splitter 612-1 typically includes a plurality of outputs, one of which supplies a further portion of the optical signals to multi-cast switch input 624-1 via amplifier 618-1. Multi-cast optical switch 624 (here shown as an M×M switch, where M is an integer, e.g., 8) acts to further power split signal input thereto, but supplies the split signals to selected outputs, instead of all its outputs (as in the case of a conventional 1×N splitter.) Thus, for example, signals appearing on input 624-1 can be supplied to output 624-5 and other selected outputs, but not every output. In which case, since output 624-5 is coupled to tunable demultiplexer 626, optical signals originating on input optical communication path 312-1 are only supplied to tunable demultiplexer 626, as well as other selected tunable demultiplexers, for example, tunable demultiplexer 628 through output 624-7). If desired, all tunable demultiplexers coupled to multi-cast optical switch 624. Receiver circuits 696-1 to 696-n can be coupled to respective ports or outputs of tunable demultiplexer 626. Similar receiver circuits are coupled to the drop ports or outputs of tunable demultiplexer 628, as well as any other tunable demultiplexer coupled to multi-cast switch 624.

As further shown in FIG. 6, other input optical communication paths 312-2 to 312-n are respectively coupled to multicast switch input 624-2 to 624-n via corresponding ones of splitters 312-2 to 312-n, optional dispersion compensating elements 330-2 to 330-n and optional amplifiers 618-2 to 618-n. Accordingly, multi-cast switch 624 can server to couple any input optical communication to any tunable demultiplexer.

The multi-cast optical switches and tunable demultiplexers and multiplexers shown in FIG. 6 are controlled in response to a service channel present on input optical communication path 312-1, for example. As noted above, demultiplexer 360 selects the service channel from input optical communication path 360 and supplies the service channel to control circuit 350. The service channel is converted to electrical signals by control circuit 350 and control signals are generated which are used to control tunable elements 624, 626, 628, 630, 632, and 634, for example.

As further shown in FIG. 6, multi-cast optical switch 634 can be used to couple any add port to any WSS output optical communication path. For example, optical signals supplied to add ports from tunable transmitters 697-1 to 697-n (it is understood that similar transmitters are coupled to the add ports of tunable multiplexer 632 as well as any other tunable multiplexer coupled to multicast optical switch 634) or inputs of tunable multiplexer or combiner 630 are combined and supplied to input 634-1 of multi-cast optical switch 634. If desired, multi-cast optical switch 634 can direct those optical signals to a particular output, e.g., out put 634-6. From there, the optical signals pass through splitter 690-6, optional optical amplifier 640-2 and dispersion compensating element 638-2. The optical signals are next combined with output signals from WSS 315 onto output optical 313-2 by combiner 320-2. Alternatively, these optical signals could be supplied to other output optical communication paths through one or more other outputs 634-5 to 634-n of multi-cast switch 634, and corresponding ones of splitters 690-5 to 690-n, optional optical amplifiers 640-1 to 640-n, dispersion compensating elements 638-1 to 638-n, and combiners 320-1 to 320-n. In a similar fashion, multi-cast optical switch 634 can couple other tunable multiplexers or combiners, such as tunable multiplexer 632, to any one of output optical communication paths 313-1 to 313-n, or be combined with the output from tunable multiplexer 630 and supplied to any desired output optical communication path.

In accordance with a further aspect of the present invention, splitter 612-1 can be provided with a supplemental output or expansion port 612-20 not connected to multi-cast switch 624, but for coupling to an additional multi-cast optical switch, if necessary. Moreover, multi-cast optical switches 624 and 634 can also include a supplemental output 624-6 and supplemental input 634-2, respectively, also for expansion purposes. Further, combiner 690-5 includes a supplemental input 604 not coupled to multi-cast switch 634, but included for coupling to an additional multi-cast optical switches, as dictated by system and capacity.

The add/drop multiplexer shown in FIG. 6 advantageously can provide 1+1 protection. For example, input optical communication path 312-1 can serve as a working path, while input optical communication path 312-2 can serve as a protection path. During normal operation, information carried by the working path 312-1 may be directed by multi-cast switch 624 toward receiver circuit 696-1. In response to a fault on working path 312-1, multi-cast switch 624 (which can also constitute an L×M switch, where L and M do not necessarily have the same value) can route signals originating from input optical path 312-2, the protection path, to output 624-5 and to tunable demultiplexer 626, which itself can be controlled to select the desired optical signals. Such rerouting can be achieved in less than 2 msec, thereby effectively realizing a 1+1 protection scheme.

Protection schemes can also be realized on the add side. For example, optical signals originating from tunable transmitter 697-1 can be directed toward a working output optical communication path 313-1 by multi-cast switch 634 through output 634-5 to combiner 690-5, optional dispersion compensating element 638-1, optional optical amplifier 640-1 and combiner 320-1. In response to a fault on optical communication path 313-1, optical signals from transmitter 697-1 can be rerouted by multi-cast switch 634 to be supplied through output 634-6 to output optical communication path (a protection path) via combiner 690-6, optional amplifier 640-2, optional dispersion compensating element 638-2 and combiner 320-2. By facilitating use of both working and protection paths, 1+1 and 1:N protection schemes can be achieved.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An expandable network element, comprising:
   a wavelength selective switch having a plurality of input ports and a plurality of output ports, each of said plurality of input ports being coupled to a respective one of a plurality of input optical communication paths, and each of said plurality of output ports being coupled to a respective one of a plurality of output optical communication paths, wherein one of said input optical communication paths carries an optical service channel;
   a plurality of first optical splitters, each of said plurality of first optical splitters being coupled to a respective one of said plurality of input optical communication paths;
   a second optical splitter having an input coupled to one of said first plurality of optical splitters, a first output and a second output;
   an optical demultiplexer coupled to said first output, said second output being a supplemental output not coupled to an optical demultiplexer, wherein said optical demultiplexer comprises a plurality of optical filtering elements, each of said optical filtering elements being tunable;
   an additional optical demultiplexer coupled to said input optical communication path, said additional optical demultiplexer being configured to select said optical service channel; and
   a control circuit coupled to said additional demultiplexer and said optical demultiplexer, said control circuit being configured to control said optical filtering elements in response to said optical service channel.

2. An expandable network element in accordance with claim 1, wherein said second optical splitters further comprises a plurality of third outputs and said optical demultiplexer is a first optical demultiplexer, said expandable network element further comprising:
   a plurality of second optical demultiplexers, each of which being coupled to a corresponding one of said plurality of third outputs.

3. An expandable network element in accordance with claim 1, further comprising:
   a plurality of third optical splitters, each of which being coupled to a corresponding one of said plurality of first optical splitters; and
   a plurality of additional optical demultiplexers, each of which being coupled to a respective one of said plurality of third optical splitters.

4. An expandable network element in accordance with claim 1, further comprising:
   a plurality of first optical combiners, each of which being coupled to a respective one of said output optical communication paths;
   a plurality of second optical combiners, each of which having a plurality of first input ports, a second input port and an output port, said output port of each of said plurality of second optical combiners being coupled to a corresponding one of said first optical combiners; and
   a plurality of third optical combiners, each of which being coupled to a respective one of said plurality of first input ports of one of said plurality of second optical combiners, said second input port being a supplemental input port not coupled to any one of said plurality of third optical combiners.

5. An expandable network element in accordance with claim 4, further comprising an optical amplifier coupled to said one of said plurality of second optical combiners and one of said first optical combiners.

6. An expandable network element in accordance with claim 1, wherein said optical demultiplexer comprises an optical splitter having an input and a plurality of outputs.

7. An expandable network element in accordance with claim 1, wherein said optical demultiplexer is provided in a modular housing.

* * * * *